US012133998B2

(12) United States Patent
Rinklake

(10) Patent No.: US 12,133,998 B2
(45) Date of Patent: Nov. 5, 2024

(54) RESCUE SYSTEM

(71) Applicant: SKYLOTEC GmbH, Neuwied (DE)

(72) Inventor: Kai Rinklake, Neuwied (DE)

(73) Assignee: Skylotec GmbH, Neuwied (DE)

( * ) Notice: Subject to any disclaimer, the term of this patent is extended or adjusted under 35 U.S.C. 154(b) by 559 days.

(21) Appl. No.: 17/342,828

(22) Filed: Jun. 9, 2021

(65) Prior Publication Data

US 2021/0379427 A1 Dec. 9, 2021

(30) Foreign Application Priority Data

Jun. 9, 2020 (EP) .................................... 20178919

(51) Int. Cl.

*A62B 35/00* (2006.01)
*B65B 25/20* (2006.01)
*B65B 31/00* (2006.01)

(52) U.S. Cl.

CPC ...... *A62B 35/0075* (2013.01); *A62B 35/0025* (2013.01); *B65B 25/20* (2013.01); *B65B 31/00* (2013.01)

(58) Field of Classification Search

CPC ....... A62B 35/0075; A62B 1/06; B65B 25/20; B65B 31/00; B65D 81/268; B65D 2203/12; B65D 79/02; D07B 2201/104; D07B 1/0613

See application file for complete search history.

(56) References Cited

U.S. PATENT DOCUMENTS

| | | | | | |
|---|---|---|---|---|---|
| 1,914,889 | A | * | 6/1933 | Lugara | A62B 1/06 224/159 |
| 2,446,361 | A | * | 8/1948 | Clibbon | B65D 81/268 206/0.5 |
| 3,145,554 | A | * | 8/1964 | Grimes | D06B 3/18 68/99 |
| 4,553,037 | A | * | 11/1985 | Veazey | F03D 13/25 290/55 |
| 4,973,448 | A | * | 11/1990 | Carlson | C23F 11/02 239/34 |
| 4,987,849 | A | * | 1/1991 | Sherman | B65D 79/02 116/200 |

(Continued)

FOREIGN PATENT DOCUMENTS

| | | | | |
|---|---|---|---|---|
| DE | 2912300 | A1 | * | 10/1980 |
| DE | 20 2004 016628 | | | 3/2005 |

(Continued)

OTHER PUBLICATIONS

European Search Report (w/ English translation) for corresponding EP Application No. 20178919.5, dated Oct. 21, 2020—9 pages.

*Primary Examiner* — Jessica L Laux
*Assistant Examiner* — Kathleen M. McFarland
(74) *Attorney, Agent, or Firm* — Woodard, Emhardt, Henry, Reeves & Wagner, LLP

(57) ABSTRACT

A rescue system for safely rescuing, in the long term, a person from a wind turbine, comprises a container that can be opened and is closed in a gas-tight manner, and a rescue device configured for rescuing the person from the wind turbine, wherein the rescue device is stored inside the container, and the container is filled with a protective gas, as a result of which the rescue device remains suitable for rescuing the person in the long term.

13 Claims, 2 Drawing Sheets

(56) References Cited

U.S. PATENT DOCUMENTS

| | | | | | |
|---|---|---|---|---|---|
| 4,990,284 | A * | 2/1991 | Lauterbach | G01N 31/222 | 524/356 |
| 5,045,331 | A * | 9/1991 | Antoon, Jr. | A23B 7/148 | 426/106 |
| 5,186,275 | A * | 2/1993 | Bajin | A62B 1/06 | 182/5 |
| 5,419,096 | A * | 5/1995 | Gorlich | B65D 81/2076 | 53/329.3 |
| 5,603,220 | A * | 2/1997 | Seaman | A61J 1/165 | 62/3.62 |
| 5,727,684 | A * | 3/1998 | Webb | B65D 75/52 | 436/1 |
| 5,730,785 | A * | 3/1998 | Idol | B65D 81/268 | 96/108 |
| 5,961,000 | A * | 10/1999 | Sanfilippo | B65B 31/00 | 141/47 |
| 6,557,462 | B1 * | 5/2003 | Wang | B65D 79/02 | 219/735 |
| 6,820,721 | B1 * | 11/2004 | Henson | A62B 35/0075 | 182/7 |
| 8,061,149 | B1 * | 11/2011 | Gowans | A61J 1/165 | 62/3.62 |
| 8,177,883 | B2 * | 5/2012 | Jorgensen | B65D 81/2076 | 426/418 |
| 9,302,795 | B1 * | 4/2016 | Beatty | B65B 25/002 | |
| 9,359,121 | B1 * | 6/2016 | Hsieh | B65D 81/2038 | |
| 9,618,456 | B2 * | 4/2017 | Glorioso | B65D 65/42 | |
| 9,792,748 | B2 * | 10/2017 | Campalans | G07C 9/00896 | |
| 10,143,763 | B2 * | 12/2018 | Campalans | A61L 2/202 | |
| 10,364,528 | B2 * | 7/2019 | Nakamura | D06M 15/00 | |
| 10,899,529 | B2 * | 1/2021 | Mokhtarzadeh | G01K 1/14 | |
| 11,340,005 | B2 * | 5/2022 | Nilsen | F25D 16/00 | |
| 11,478,321 | B2 * | 10/2022 | Wang | B65D 81/2038 | |
| 11,602,245 | B2 * | 3/2023 | Pyle | A47J 47/02 | |
| 2006/0151354 | A1 * | 7/2006 | Dombroski | B65D 81/2053 | 206/524.8 |
| 2008/0029338 | A1 * | 2/2008 | Rosal | A62B 1/06 | 182/70 |
| 2008/0178734 | A1 * | 7/2008 | Butler | B23K 35/0266 | 73/31.03 |
| 2009/0185948 | A1 * | 7/2009 | Jorgensen | B65D 81/2076 | 422/4 |
| 2009/0218167 | A1 * | 9/2009 | Lee | A62B 1/06 | 182/142 |
| 2011/0050415 | A1 * | 3/2011 | Fan | B65D 43/16 | 340/540 |
| 2011/0138699 | A1 * | 6/2011 | Niehues | A62B 1/06 | 182/5 |
| 2017/0022979 | A1 * | 1/2017 | Teichert | B66B 9/00 | |
| 2017/0045461 | A1 * | 2/2017 | Glorioso | B01J 20/261 | |
| 2018/0099062 | A1 * | 4/2018 | Campalans | B65D 81/2076 | |
| 2018/0274843 | A1 * | 9/2018 | Lombardo | F25D 29/003 | |
| 2019/0047824 | A1 * | 2/2019 | Ifversen | B66B 11/04 | |
| 2020/0039719 | A1 * | 2/2020 | Wang | A61B 50/30 | |
| 2020/0180845 | A1 * | 6/2020 | Mokhtarzadeh | B65D 81/3862 | |
| 2020/0189808 | A1 * | 6/2020 | Bilinski | G07C 9/00896 | |
| 2021/0107722 | A1 * | 4/2021 | Whalen | B65D 43/163 | |
| 2022/0135312 | A1 * | 5/2022 | Cabouli | B65D 81/2038 | 206/524.8 |

FOREIGN PATENT DOCUMENTS

| | | | | |
|---|---|---|---|---|
| DE | 202004016628 | U1 * | 4/2005 | B65D 79/02 |
| DE | 10 2008 046456 | | 3/2010 | |
| DE | 102008046456 | A1 * | 3/2010 | B65D 1/12 |
| DE | 20 2018 000648 | | 4/2018 | |
| DE | 202018000648 | U1 * | 5/2018 | |

* cited by examiner

RESCUE SYSTEM

CROSS-REFERENCE TO RELATED APPLICATIONS

This application is based upon and claims the right of priority to EP application Ser. No. 20/178,919.5 filed on Jun. 9, 2020, the disclosure of which is hereby incorporated by reference herein in its entirety for all purposes.

TECHNICAL FIELD

The invention relates to a rescue system for safely rescuing, in the long term, a person from a wind turbine. The invention furthermore relates to an array comprising a wind turbine and the above rescue system.

BACKGROUND OF THE INVENTION

Modern wind turbines include lifts, by means of which installers and service technicians can reach the nacelle of the wind turbine so as to then be able to work without a harness inside the nacelle without the risk of falling. In the event of an accident, for example due to a heart attack, a dizzy spell, an impact injury or a cut or the like, the installer or service technician having the accident is often no longer able to independently reach the lift since the access to the lift is often narrow and winding due to space constraints in the nacelle. The same applies in the event of a fire in the nacelle or at a tower of the nacelle. In both instances, it is necessary to rapidly evacuate the installer or service technician having the accident from the nacelle.

For the evacuation, rescue devices for rescuing and evacuating people are kept available in the nacelle in sufficient quantity and for rapid access. The rescue devices have to be serviced at regular intervals or inspected for the functionality and operability thereof. For example, it is necessary to inspect rescue gear, including unused gear, that is kept available for emergencies, once a year, to ensure that, in the event of an emergency, it is in perfect technical condition and has not been rendered unusable, for example as a result of corrosion. At the same time, certain components of the rescue devices are subject to aging and have to be replaced at regular intervals, for example every 10 years. This is associated with additional work and costs.

A need therefore exists to ensure the operability of the rescue device in a wind turbine in the long term so as to extend the intervals for inspection.

DESCRIPTION OF THE INVENTION

Proceeding from this situation, it is an object of the present invention to provide means for extending the operability of the rescue devices in the wind turbine.

The object is achieved by the features of the independent claim. Advantageous embodiments are provided in the dependent claims.

The object is accordingly achieved by a rescue system for safely rescuing, in the long term, a person from a wind turbine, comprising a container that can be opened and is closed in a gas-tight manner, and a rescue device configured for rescuing the person from the wind turbine, wherein the rescue device is stored inside the container, and the container is filled with a protective gas, as a result of which the rescue device remains suitable for rescuing the person in the long term.

An essential aspect of the invention is that the rescue device is stored in the container that is closed in a gas-tight manner, and the container is filled with the protective gas. In other words, the rescue device is stored in a protective gas atmosphere, which is provided by the gas-tight container. By way of the rescue device thus 'preserved,' the person is able to independently rescue himself or herself from the wind turbine, for example by rappelling down, for example when a fire has broken out on a nacelle of the wind turbine.

In the present example, a protective gas shall be understood to mean a gas or gas mixture that has a different composition than air and, particularly preferably has a reduced oxygen content compared to air. The protective gas is particularly preferably an inert gas or an inert gas mixture, that is, a gas or gas mixture that is very slow to react.

In the present example, a container that is closed in a gas-tight manner shall preferably be understood to mean a container that is configured in such a way that a leakage rate is preferably $\leq 10^{-7}$ mbar l/s. The leakage rate is generally dependent on the protective gas that is used, a pressure difference, and the temperature, and is a measure of the units of volume or mass of the protective gas exiting the container. A leakage rate of $10^{-7}$ mbar l/s means that, in the case of a pressure difference between a space inside the container and a space outside the container of 1 bar, a loss of protective gas from the container of approximately 1 $cm^3$ occurs over 100 days. More preferably, the leakage rate is $\leq 10^{-9}$ mbar l/s. The leakage rate can be ascertained based on a leak test according to DIN EN 1779, for example.

It has been shown that the protective gas in the gas-tight container extends the operability of the rescue device. In the present example, operability shall be understood to mean the time interval within which the rescue device is suitable for rescuing the person, and meets the certification and safety requirements, in particular the International Standard for Safe Working on Ropes ISO 10333-1 to 10333-3 and/or the Technical Rules for Safety in the Workplace TRBS 2121-3 and/or the rescue device meets the standards applicable to the rescue device. When the rescue device is configured as a manual braking device, for example, operability shall, for example, be understood to mean the time interval within which the manual braking device meets the standard EN 15151-2.

The rescue system according to the invention thus extends the operability of the rescue device in the wind turbine in a simple manner, thus ensuring long-term functionality of the rescue device. The rescue system thus contributes to greater safety of rope access technicians when working on the wind turbine.

According to a preferred refinement, a foil is provided in which the rescue device is provided, in particular in a gas-tight manner. The foil is preferably configured as a foil pouch and/or the rescue device is heat-sealed in the foil. The foil is more preferably filled with protective gas. In this respect, the expression that the container is filled with the protective gas may likewise encompass that only the foil is filled with the protective gas. The rescue device can furthermore be stored in the container that is closed in a gas-tight manner, wherein the rescue device in the container can additionally be heat-sealed in the foil that is closed in a gas-tight manner. The foil is preferably designed as a homogeneous sheet material made of an in particular thin metal or plastic material. The plastic foil can have a wall thickness of 2 μm to 0.5 mm and/or be made of polymer. A foam can be provided instead of a foil.

According to a preferred refinement of the invention, the rescue device is configured as a harness, a helmet, a lanyard, a restraint rope, a descender, rescue gear, in particular rescue gear including a lifting function, a retractable-type fall arrester, fall arrester gear, a rope, life-saving equipment, a shock absorber, a rope brake, a net, a carabiner, an anchor device and/or a belay device. It goes without saying that multiple rescue devices can be provided in the container.

The rescue device preferably corresponds to the applicable standards. More preferably, a harness shall be understood to mean part of personal protective equipment (in particular Category III PPE) of rope access technicians, which is worn on the body during activities associated with a risk of falling and which, via the lanyard, establishes a connection between the rope access technician and a restraint point. During roping up, the restraint point can represent the rope, for example. The lanyard can take on additional functions beyond the connection and can, for example, encompass an integrated shock absorber.

A descender shall preferably be understood to mean a mechanical device for decelerating a rope passing through. Descenders are used during rappelling and often comprise an automatic braking or blocking function. Descenders, which are likewise suitable for securing and meet the standard DIN EN 15151, are generally referred to as belay devices.

Rescue gear is preferably understood to mean a descender that has a defined maximum descent speed, and more preferably is offered with a fixedly installed rope in differing lengths. Rescue gear according to EN 12841 Type C is intended for working on a rope and for rescue purposes, while rescue gear according to EN 341 is approved as evacuation and rescue gear. Rescue gear that includes a lifting function can be used to raise persons having an accident so as to free them from the restraint and then rappel them down. More preferably, the rescue gear is suitable for rescuing a person while accompanying this person.

The retractable-type fall arrester is preferably part of an arresting system, which allows free movement within an operating range while working high above the ground, and which, in the event of a fall, mitigates the forces acting on the body as a result of braking and damper systems.

Arrester gear allows a rope length to be adjusted so that a distance of a fall is kept short, even with changing working position, in the event of a fall.

Life-saving equipment is used to transport an injured person and/or damaged material. The life-saving equipment preferably allows the person to be rescued from a hazardous situation.

For the purpose of extending the operability of the rescue device, it is provided according to a preferred refinement of the invention that the rescue device comprises a washed and/or spinning oil-free rope. During the production of ropes, spinning oils are used during the spinning process for an enhanced ability to process fibers to ropes. However, residue of the spinning oils on the ropes can adversely affect the operability of the rescue device since the spinning oils break down as a result of oxidation processes. By using washed ropes, in which the residue of the spinning oils has been mitigated by washing, and/or by using spinning oil-free ropes, the operability of the rescue device can be extended.

In principle, different gases and/or gas mixtures can be used as the protective gas. However, according to a preferred refinement of the invention, the protective gas is selected from the group consisting of nitrogen ($N_2$), argon (Ar), carbon dioxide ($CO_2$), nitrous oxide ($N_2O$), sulfur hexafluoride ($SF_6$) and/or mixtures thereof. As was already mentioned, the leakage rate of the container and/or of the foil is generally dependent on the protective gas. In contrast to very small molecular protective gases, such as helium and hydrogen, which are able to diffuse through minute leaks in the container and/or the foil, the aforementioned protective gases have the advantage that the design of the container and/or of the foil, for being closed in a gas-tight manner, is smaller than for small molecular protective gases. The protective gas is preferably selected from the group consisting of nitrogen ($N_2$), argon (Ar), sulfur hexafluoride ($SF_6$) and/or mixtures thereof. These gases are furthermore characterized by easy handling, are not fire promoting and not acidic, that is, they do not form an acid in water.

With respect to the extension of the operability of the rescue device, and in connection with the protective gas, it is provided according to a further preferred refinement of the invention that the protective gas has a trace moisture level of less than 2000 ppm v/v $H_2O$. In other words, the protective gas is a very dry gas. It has been shown that the operability of the rescue device can be considerably extended, in particular by avoiding moisture.

In this connection, it is provided according to a preferred refinement of the invention that the rescue system comprises a desiccant provided inside the container. A desiccant shall preferably be understood to be an agent that absorbs moisture, that is, acts hygroscopically, and/or that is able to bind corrosive gases, thereby precluding, or at least preventing, a negative effect on the rescue device. The moisture can thus be further reduced. The desiccant preferably comprises dried silica gel, phosphorus pentoxide, aluminum oxide, calcium, calcium hydride, calcium oxide, calcium sulfate, potassium carbonate, potassium hydroxide, copper sulfate and/or mixtures thereof. More preferably, it is provided that a water indicator is added to the desiccant, which indicates the level of depletion of the desiccant. For example, the originally colorless water indicators turns from green, to blue-green, to blue upon absorbing water. In this way, it is possible to check in a simple manner whether the dry conditions for extending the operability of the rescue device are adhered to.

The desiccant can be provided in the container and/or in the foil. The desiccant can comprise copper particles having comparatively large surface structures, which are permanently chemically cross-linked in a plastic composite. Such a desiccant can generate a neutralized atmosphere, which protects all materials stored therein against corrosion and aging. The material used under the intercept trade name can be used as the desiccant. The desiccant can likewise comprise a so-called volatile corrosion inhibitor, which transport active ingredients, for example active ingredients sold under the EXCOR trade name, which essentially bring the corrosion process to a halt.

As an alternative or in addition to the described water indicator, it is provided according to a further preferred refinement of the invention that the rescue system comprises one or more indicators that are arranged at the container and configured to indicate the intactness, in particular a status, of the container, of the protective gas and/or of the rescue device. The indicator can be arranged inside the container and/or at the container, in particular on an outer side of the container. The indicator preferably indicates the intactness or the status of the container, preferably whether the container was opened, how long the container was stored and/or when the last inspection of the container was carried out or whether an inspection is necessary. More preferably, the indicator indicates the status of the protective gas, preferably a moisture content and/or an oxygen content of the protective gas. More preferably, this makes it possible to ascertain whether the container was damaged in such a way that the container lost the gas-tight properties thereof. More preferably, the indicator indicates the status of the rescue device, preferably how long the rescue device was stored in the container and/or when the last inspection of the rescue device was carried out. The indicator is preferably an indicator that is not dependent on external power supply and/or self-sufficiently ensures the power supply thereof. The indicator can also comprise an internal power supply unit.

According to a further preferred refinement of the invention, it is provided that the container does not allow UV radiation to pass and is made of plastic material and/or of aluminum. For the purpose of extending the operability of the rescue device, the rescue device is preferably protected against UV radiation by the container. UV radiation can accelerate decomposition processes and, for example, cause plastic to become brittle. The operability of the rescue device can be extended by protecting it against UV radiation. The container is preferably made of plastic and/or aluminum, thereby allowing the rescue device to be protected against UV radiation in a simple manner. These materials furthermore have the advantage that the container is lightweight and robust.

With respect to the container, it is preferably provided that the container is configured as a protective case, box and/or crate. The container more preferably includes a viewing window. A viewing window makes it possible to carry out a visual inspection of the rescue device inside the container even when the container is closed. A viewing window, when using an indicator inside the container, furthermore has the advantage that the status of the container, of the protective gas, and/or of the rescue device can be checked in a simple manner without opening the container.

For the purpose of good handling, it is preferably provided that the container comprises one or more handles, which allow the container to be carried. The container particularly preferably has a cuboid shape. Preferred dimensions are 55×35×24.5 cm, each +/−10%. Such dimensions are particularly suitable during handling and allow sufficient storage space for storing the rescue device.

More preferably, it is provided that the container is reusable. Reusable preferably means that the container remains gas-tight after having been opened and closed. In particular, reusable means that the protective gas inside the container is not provided by disposable packaging that is destroyed when the container is opened. Preferably, it is thus not provided that an opening of the container and/or the container are heat-sealed with foil from the outside.

According to another preferred refinement of the invention, it is provided in this connection that the container comprises a seal for gas-tight closing, which extends circumferentially along an opening of the container. The seal ensures in a simple manner that the container is gas-tight and preferably reusable. The container, which in particular is designed to be cuboid, preferably comprises a bottom, a plurality of side walls, the opening delimited by the side walls, and a lid for closing the opening. The seal can be provided either at the lid or at the side walls. Along the opening delimited by the side walls, the container preferably comprises a circumferential sealing groove, including a sealing element inserted therein, and the lid preferably comprises a circumferential sealing rib. As an alternative, the lid comprises a circumferential sealing groove, including a sealing element inserted therein, and the circumferential sealing rib extends along the opening delimited by the side walls. The sealing groove and the sealing rib are preferably configured in such a way that the sealing rib, in a state in which the opening is closed by the lid, engages in the sealing groove and rests against the sealing element in a sealing manner.

So as to further extend the operability of the rescue device, it is provided according to a preferred refinement that the rescue device is additionally packaged inside the container, for example inside a closed plastic foil. It is preferably provided that the rescue device is vacuum-packed. Vacuum packaging shall preferably be understood to mean a substantially gas-tight packaging of the rescue device, which is provided around the rescue device by using negative pressure. The requirements with regard to the tightness of the vacuum packaging preferably correspond to the requirements with regard to the container. However, it is also possible that the tightness of the vacuum packaging is less than that of the container. In addition to extending the operability of the rescue device, the vacuum packaging has the advantage that the volume necessary for storing the rescue device is reduced.

In connection with the reusability and the operability of the rescue device, it is preferably provided that the container that is closed in a gas-tight manner is sealed with a closing seal. As long as no accident occurs, which causes the rescue device in the container to be used, the closed container is preferably only opened by an authorized inspector who inspects the operability of the rescue device and ensures that appropriate standards are met. After a successful inspection, the inspector seals the container again with a closing seal. The closing seal at the container allows the user to identify that a manipulation of the container is not desired.

Further technical effects and advantages of the container are apparent to a person skilled in the art from the description of the following method for extending an operability of a rescue device, from the array comprising a wind turbine and a rescue system, as well as from the description of the exemplary embodiments and the figures.

The invention furthermore relates to a method for extending an operability of a rescue device for rescuing a person from a wind turbine, comprising the following steps:

- providing a container that can be closed in a gas-tight manner and the rescue device;
- arranging the rescue device, in particular inside a foil, inside the container;
- preferably adding a desiccant for absorbing harmful outgasing;
- filling the container with protective gas and, in particular, heat-sealing the foil in a gas-tight manner; and
- closing the container in a gas-tight manner.

The core of the method is that the rescue device is arranged in a gas-tight container, which is then filled with protective gas and closed in a gas-tight manner. The container thus provides a protective gas atmosphere, in which the rescue unit can be stored in the long-term without losing the operability thereof. In this way, in particular the time interval after which the rescue device no longer meets the standards applicable to the rescue device can be extended.

Preferably, it is provided that the filling of the container with protective gas and the gas-tight closing of the container comprises flushing the container with protective gas and/or evacuating it, once or several times, including subsequently flushing the container with protective gas. The container preferably comprises a valve that can be closed in a gas-tight manner, for example a double check valve or a directional valve, which allows a flow of the protective gas out of the container to be blocked and/or the flow direction to be changed.

The method more preferably comprises one or more of the following steps:

- vacuum packing the rescue device;
- arranging one or more indicators in the or at the container;
- arranging a desiccant in the container;
- sealing the closed container with a closing seal; and
- arranging the closed, and optionally sealed, container in a generator house of a wind turbine.

Additional advantages and technical effects of the method are analogously apparent to a person skilled in the art from the description of the rescue system and of the array comprising the wind turbine and the rescue system.

The invention furthermore relates to an array comprising a wind turbine and the above rescue system, wherein the wind turbine comprises a tower and, on the tip thereof, a generator house, and the rescue system is arranged at or inside the generator house.

The generator house, which is mounted on the top of the tower, can preferably track the wind direction. Other designations for the generator house are engine house or nacelle. Wind turbines can easily reach heights of more than 100 m, wherein in general lifts and/or ladders provided in or at the tower are used instead of scaffolds and bucket trucks for carrying out installation, maintenance and repair work, by way of which the installers and/or service technicians reach the nacelle.

The array allows the work on wind turbines to be made safer since the rescue system, and thus the rescue device, is kept available directly at the work site of the rope access technicians. The array has the advantage that the time intervals after which the rescue device for rescuing people has to be serviced or inspected with respect to the functionality and operability thereof is extended. The array thus saves effort and costs.

BRIEF DESCRIPTION OF THE DRAWINGS

The invention will be described hereafter in greater detail based on preferred exemplary embodiments with reference to the accompanying drawings.

In the drawings.

DETAILED DESCRIPTION OF THE EXEMPLARY EMBODIMENTS

Figure 1:
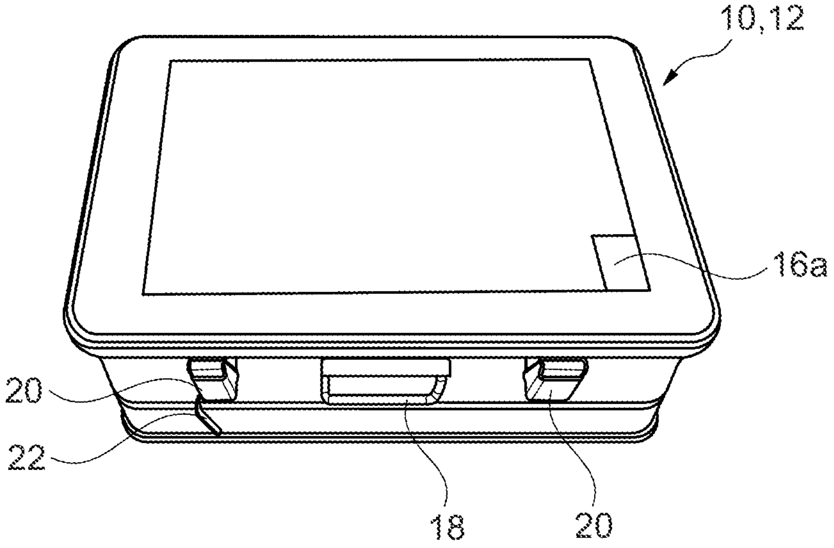
FIG. 1 shows a container of a rescue system according to a preferred exemplary embodiment of the invention.

FIG. 1 schematically shows a container 10 of a rescue system 12 for safely rescuing, in the long term, a person from a wind turbine 32 (shown in FIG. 3), according to a preferred exemplary embodiment of the invention. In the present example, the container 10 is configured as a protective case, wherein the container 10 is shown in the closed state. The container 10 is configured to be gas-tight, wherein a rescue device 14 (shown in FIG. 2) and a protective gas, which in the present example is nitrogen, are present inside the container 10. The nitrogen is nitrogen 2.8, that is nitrogen having a purity of ≥99.8%. The nitrogen furthermore has a trace moisture level of ≤40 ppm v/v. The rescue device 14 is heat-sealed in a gas-tight manner in a foil 44 (shown in FIG. 2).

An indicator 16*a* for indicating a status of the container 10 and a status of the rescue device 14 is provided at the container 10. In the present example, the indicator 16*a* indicates how long the container 10 has been stored, when the last inspection of the container 10 was carried out, and when the last functional test of the rescue device 14 was carried out.

The container 10 comprises a handle 18 by way of which the container 10 can be easily carried. In addition, closures 20 are sealed with a closing seal 22. The container 10 is made of aluminum in the present example, whereby the container 10 does not allow UV radiation to pass. In the present preferred exemplary embodiment, the dimensions of the container 10 are 55×35×24.5 cm.

Figure 2:
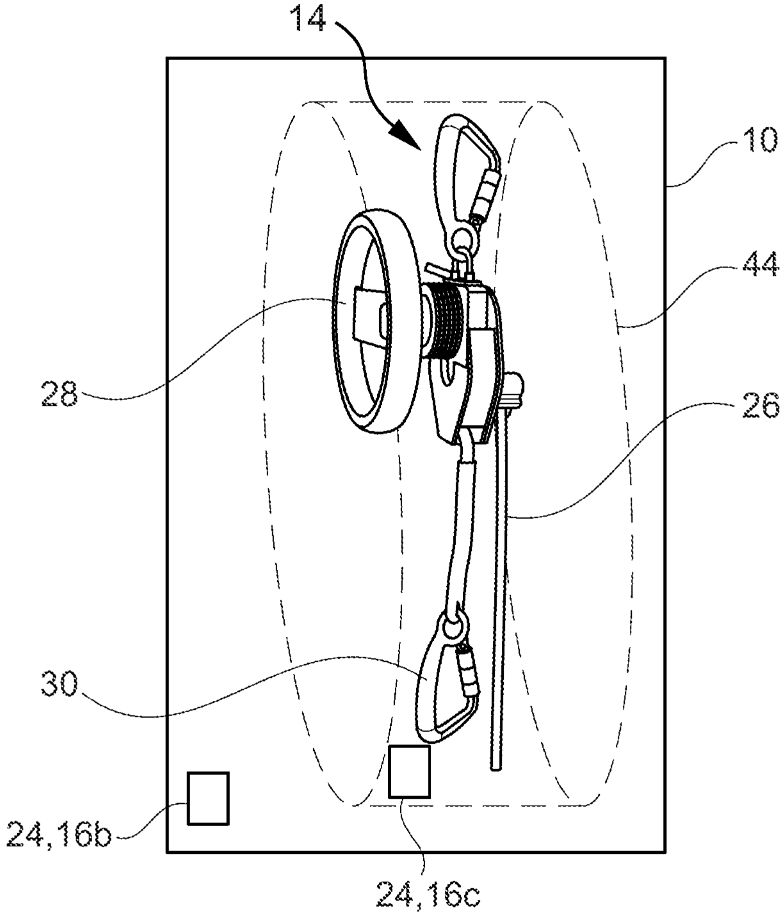
FIG. 2 shows a rescue device, which is stored inside the container of FIG. 1.

FIG. 2 schematically shows the content of the container 10, that is, the rescue device 14 stored in the container 10, wherein the rescue device 14 is heat-sealed in the foil 44. FIG. 2 furthermore shows that a further indicator 16*b* for indicating the status of the protective gas is arranged in the container 10. In the present example, this is a water indicator 16*b*, which indicates the level of depletion of a desiccant 24 that is likewise arranged in the container. The desiccant 24 ensures that the protective gas maintains a low level of moisture in the long term. The indicator 16*b* furthermore makes it possible to recognize, indirectly, whether the container 10 is damaged in such a way that the container 10 has lost the gas-tight properties thereof. The foil 44 can likewise be provided with a desiccant 24 and an indicator 16*c*.

In the present example, the rescue device 14 configured as rescue gear 14 that meets the standards DIN EN 1496-A: 2017 and DIN EN 341-1A:2011. The rescue gear 14 is configured to rescue persons, wherein the rescue gear 14 includes a lifting function. The rescue gear 14 comprises a rope 26, this being a washed rope 26, which is free of spinning oil, in the present example. A turning wheel 28 allows a person who is connected to the rope 26 via a carabiner 30 to be lifted.

Figure 3:
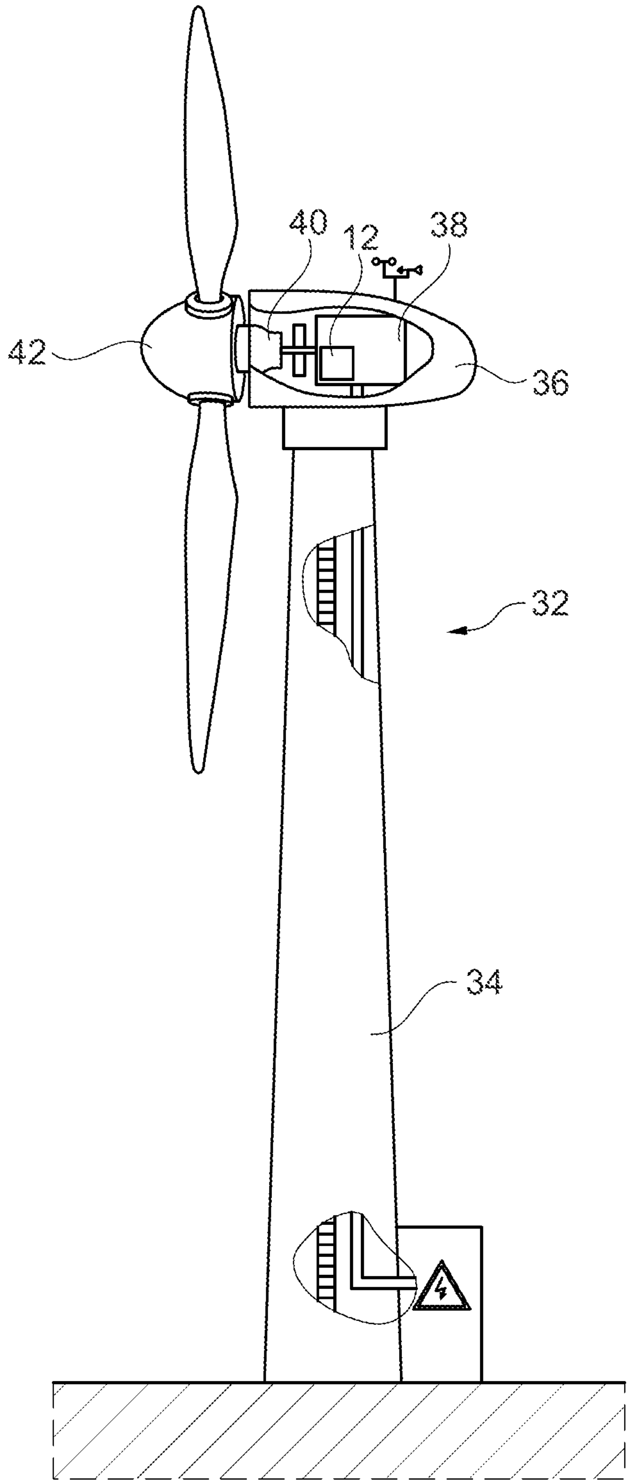
FIG. 3 shows an array of the rescue system of FIG. 1 and a wind turbine according to a preferred exemplary embodiment of the invention.

FIG. 3 schematically shows an array comprising a wind turbine 32 and the rescue system 21 from FIG. 1. The wind turbine 32 comprises a tower 34, on the tip of which a nacelle 36 is arranged. A generator 38 of the wind turbine 32, which is connected to a hub 42 via a gear box 40, is situated inside the nacelle 36. The rescue system 12 is provided directly at an outside wall of the generator 38 and is thus arranged inside the nacelle 36. For example, during a fire of the wind turbine 32, a person present in the nacelle 36 can open the container 10, remove the rescue device 14, and rappel from the nacelle 36 down to the ground by way of the rescue device 14.

The described exemplary embodiments are only examples, which can be modified and/or supplemented in a variety of ways within the scope of the claims. Each feature that was described for a particular exemplary embodiment can be used alone, or in combination with other features, in any arbitrary other exemplary embodiment. Each feature that was described for an exemplary embodiment of a particular category can also be used in a corresponding manner in an exemplary embodiment of another category.

LIST OF REFERENCE NUMERALS

Container 10
Rescue system 12
Rescue device, rescue gear 14
Indicator 16
Handle 18
Closure 20

Closing seal 22
Desiccant 24
Rope 26
Turning wheel 28
Carabiner 30
Wind turbine 32
Tower 34
Nacelle 36
Generator 38
Gear box 40
Hub 42
Foil 44

The invention claimed is:

1. A rescue system for safely rescuing, in the long term, a person from a wind turbine, comprising:
- a container that can be opened and is closed in a gas-tight manner; and
- a rescue device configured for rescuing the person from the wind turbine, wherein the rescue device comprises a spinning oil-free rope,
- the rescue device being stored inside the container,
- the container being filled with a protective gas, as a result of which the rescue device remains suitable for rescuing the person in the long term, wherein the protective gas has a trace moisture level of less than 2000 ppm v/v $H_2O$, and
- a desiccant comprising a volatile corrosion inhibitor is located inside the container.

2. The rescue system according to claim 1, comprising at least one of a foil in which the rescue device is provided and a foil in which the rescue device is provided in a gas-tight manner.

3. A rescue system according to claim 1, wherein the rescue device is configured as at least one of a harness, a helmet, a lanyard, a restraint rope, a descender, rescue gear, a retractable-type fall arrester, fall arrester gear, a rope, life-saving equipment, a shock absorber, a rope brake, a net, a carabiner, an anchor device and/or a belay device.

4. A rescue system according to claim 1, wherein the protective gas is selected from the group consisting of nitrogen ($N_2$), argon (Ar), carbon dioxide ($CO_2$), nitrous oxide ($N_2O$), sulfur hexafluoride ($SF_6$) and/or mixtures thereof.

5. A rescue system according claim 1, comprising one or more indicators that are arranged at the container and configured to indicate the intactness of the container, of the protective gas and/or of the rescue device.

6. A rescue system according to claim 1, wherein the container does not allow UV radiation to pass and is made of plastic material and/or of aluminum.

7. A rescue system according to claim 1, wherein the container is configured as a protective case, box and/or crate.

8. A rescue system according to claim 1, wherein the container comprises a bottom, a plurality of side walls, an opening delimited by the side walls, and a lid for closing the opening.

9. A rescue system according to claim 1, wherein the container comprises a seal for gas-tight closure, which extends circumferentially along an opening of the container.

10. An array, comprising a wind turbine and a rescue system according claim 1, the wind turbine comprising a tower and a generator house arranged on a tip thereof, and the rescue system being arranged at or inside the generator house.

11. A rescue system according to claim 1, wherein the protective gas is nitrogen having a trace moisture level of less than or equal to 40 ppm v/v $H_2O$.

12. A method for extending an operability of a rescue device for rescuing a person from a wind turbine, comprising the following steps:
- providing a container that can be closed in a gas-tight manner and the rescue device;
- arranging the rescue device inside the container, wherein the rescue device comprises spinning oil-free rope;
- arranging a desiccant comprising a volatile corrosion inhibitor inside the container;
- filling the container with a protective gas; and
- closing the container in a gas-tight manner.

13. The method according to claim 12, comprising the following steps:
- arranging the rescue device inside a foil; and
- heat-sealing the foil in a gas-tight manner; and/or
- adding a desiccant to the container and/or to the foil for absorbing harmful outgassing.

* * * * *